(12) United States Patent
Chen

(10) Patent No.: US 7,287,644 B2
(45) Date of Patent: Oct. 30, 2007

(54) SUSPENSION DEVICE FOR A TOOL SOCKET

(76) Inventor: Kun-Chen Chen, No. 6, Lane 609, Sec. 1, Chung-Shan Rd. Ye-Her Li, Tachia Chen, Taichung Hsien (TW)

( * ) Notice: Subject to any disclaimer, the term of this patent is extended or adjusted under 35 U.S.C. 154(b) by 344 days.

(21) Appl. No.: 11/131,488

(22) Filed: May 18, 2005

(65) Prior Publication Data

US 2006/0284039 A1    Dec. 21, 2006

(51) Int. Cl.
*B65D 85/28* (2006.01)
(52) U.S. Cl. ............... 206/378; 206/349; 206/806; 248/309.1; 211/70.6
(58) Field of Classification Search ............... 206/378, 206/349, 493, 495, 806; 211/70.6, 118; 248/309.1, 248/221.11, 222.11, 222.12, 304, 317
See application file for complete search history.

(56) References Cited

U.S. PATENT DOCUMENTS

| | | | | |
|---|---|---|---|---|
| 3,298,516 A * | 1/1967 | Leopold | | 206/378 |
| 5,740,911 A * | 4/1998 | Chou | | 206/378 |
| 5,862,913 A * | 1/1999 | Chou | | 206/378 |
| 5,967,340 A * | 10/1999 | Kao | | 211/70.6 |
| 5,975,297 A * | 11/1999 | Kao | | 206/378 |
| 6,092,656 A * | 7/2000 | Ernst | | 206/378 |
| 6,126,004 A * | 10/2000 | Ling | | 206/377 |
| 6,386,363 B1 * | 5/2002 | Huang | | 206/378 |
| 6,669,032 B2 * | 12/2003 | Kao | | 211/70.6 |
| 6,672,555 B2 * | 1/2004 | Chang | | 248/317 |
| 6,679,379 B1 * | 1/2004 | Kao | | 206/349 |
| 6,719,154 B2 * | 4/2004 | Kao | | 211/70.6 |
| 6,902,058 B1 * | 6/2005 | Chang | | 206/378 |
| 7,066,339 B2 * | 6/2006 | Chiu et al. | | 211/70.6 |
| 7,118,406 B2 * | 10/2006 | Mu et al. | | 439/419 |
| 7,152,747 B2 * | 12/2006 | Wang | | 211/70.6 |
| 7,210,578 B2 * | 5/2007 | Tuan-Mu et al. | | 206/378 |
| 2003/0024837 A1 * | 2/2003 | Chen | | 206/378 |
| 2003/0141211 A1 * | 7/2003 | Tsai | | 206/378 |
| 2004/0050734 A1 * | 3/2004 | Kao | | 206/370 |
| 2004/0173485 A1 * | 9/2004 | Huang | | 206/349 |
| 2004/0178096 A1 * | 9/2004 | Kao | | 206/349 |
| 2004/0188366 A1 * | 9/2004 | Tong | | 211/70.6 |
| 2005/0067307 A1 * | 3/2005 | Kao | | 206/349 |
| 2005/0121344 A1 * | 6/2005 | Chang | | 206/378 |
| 2005/0126943 A1 * | 6/2005 | Liu | | 206/378 |
| 2005/0230335 A1 * | 10/2005 | Chiu et al. | | 211/70.6 |
| 2005/0230587 A1 * | 10/2005 | Yang | | 248/314 |
| 2006/0207951 A1 * | 9/2006 | Wang | | 211/70.6 |
| 2006/0219647 A1 * | 10/2006 | Shih | | 211/70.6 |
| 2006/0254940 A1 * | 11/2006 | Mu et al. | | 206/378 |

* cited by examiner

*Primary Examiner*—Kimberly T Wood
(74) *Attorney, Agent, or Firm*—Alan Kamrath; Kamrath & Associates P.A.

(57) ABSTRACT

A suspension device for a tool socket has a hanging panel (10), an end cap (20) and a fastening strip (30). The hanging panel (10) has a strip latch (12), and the end cap (20) has a through hole (22). The fastening strip (30) has an elongated body, a block (32) and a tongue (34). The tongue (34) of the fastening strip (30) is mounted through the through hole (22), a tool socket and the strip latch (12) to conveniently assembly the suspension device. Moreover, the fastening strip (30) allows the suspension device to be used with different sized tool sockets.

8 Claims, 7 Drawing Sheets

SUSPENSION DEVICE FOR A TOOL SOCKET

BACKGROUND OF THE INVENTION

1. Field of the Invention

The present invention relates to a suspension device for a tool socket, and more particularly a suspension device that holds various tool sockets in different sizes and can be assembled easily.

2. Description of Related Art

With reference to FIG. 7, a conventional suspension device for a tool socket comprises a hanging panel (50) and a bottom disk (60).

The hanging panel (50) is rectangular and has a top edge (not numbered), a bottom edge (not numbered), a suspension hole (51) and a prong (52). The suspension hole (51) is defined near the top edge of the hanging panel (50), and the prong (52) extends from the bottom edge. The prong (52) has a neck (522) and a cylindrical body (524). The neck (522) is integrally formed with the bottom edge of the hanging panel (50). The cylindrical body (524) is formed under the neck (522), extends through a tool socket (70) and has a length, a width, a distal end (not numbered) and a resilient barbed spur (526). Individual cylindrical bodies (524) have different lengths and widths to accommodate different sized tools (70). The resilient barbed spur (526) is integrally formed at the distal end of the cylindrical body (524) and has an enlarged head (not numbered).

The bottom disk (60) attaches to the cylindrical body (524) and has a central hole (62), an outer edge and multiple teeth (64). The central hole (62) is slighter smaller than the resilient barbed spur (526). Therefore, squeezing the resilient barbed spur (526) and pressing the resilient barbed spur (526) through the central hole (62) securely attaches the bottom disk (60) to the hanging panel (51). The multiple teeth (64) are formed on, are evenly spaced around and protrude longitudinally from the outer edge toward the hanging panel (51).

However, the suspension device must be manufactured with cylindrical bodies (524) in many different lengths and widths to accommodate different sized tool sockets (70). Moreover, the structure of the conventional suspension device is complex so the manufacturing production rate is correspondingly reduced.

To overcome the shortcomings, the present invention provides a suspension device to mitigate and obviate the aforementioned problems.

SUMMARY OF THE INVENTION

The main objective of the invention is to provide a suspension device for a tool socket that can be used with various tool sockets of different sizes and can be assembled conveniently.

Other objects, advantages and novel features of the invention will become more apparent from the following detailed description when taken in conjunction with the accompanying drawings.

DETAILED DESCRIPTION OF PREFERRED EMBODIMENT

A suspension device for a tool socket in accordance with the present invention comprises a top plate, a bottom base and a fastening strip. The top plate has a buckled head and the bottom base has a through hole. The fastening strip has an elongated body with a block and tongue. By inserting The fastening strip through the through hole and the tool socket to secure the elongated body on the buckled head, the suspension device is assembled conveniently. Moreover, length of the fastening strip is adjustable to apply to different tool sockets having various sizes.

Figure 1:
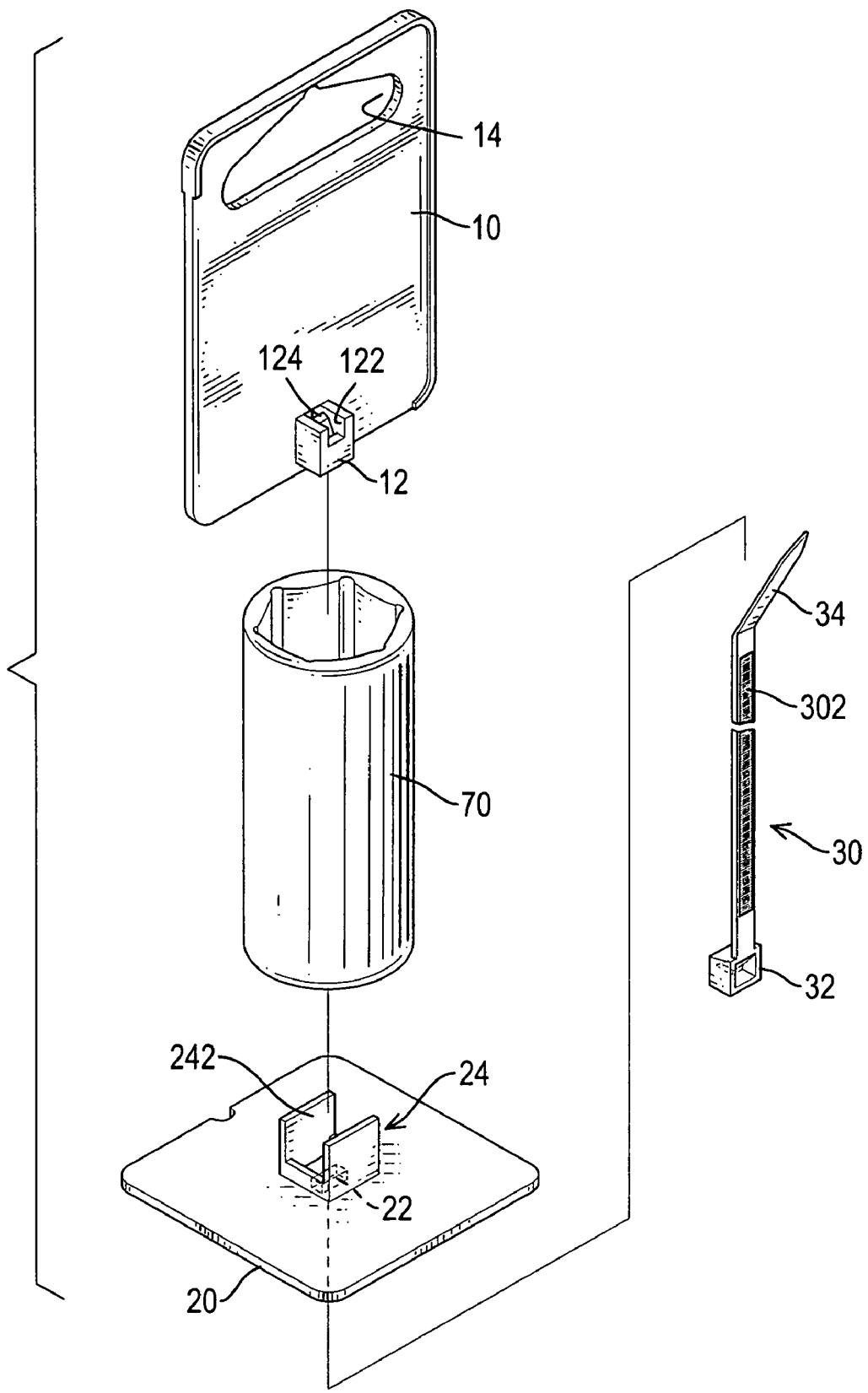
FIG. 1 is an exploded perspective view of a suspension device for a tool socket in accordance with the present invention.
Figure 2:
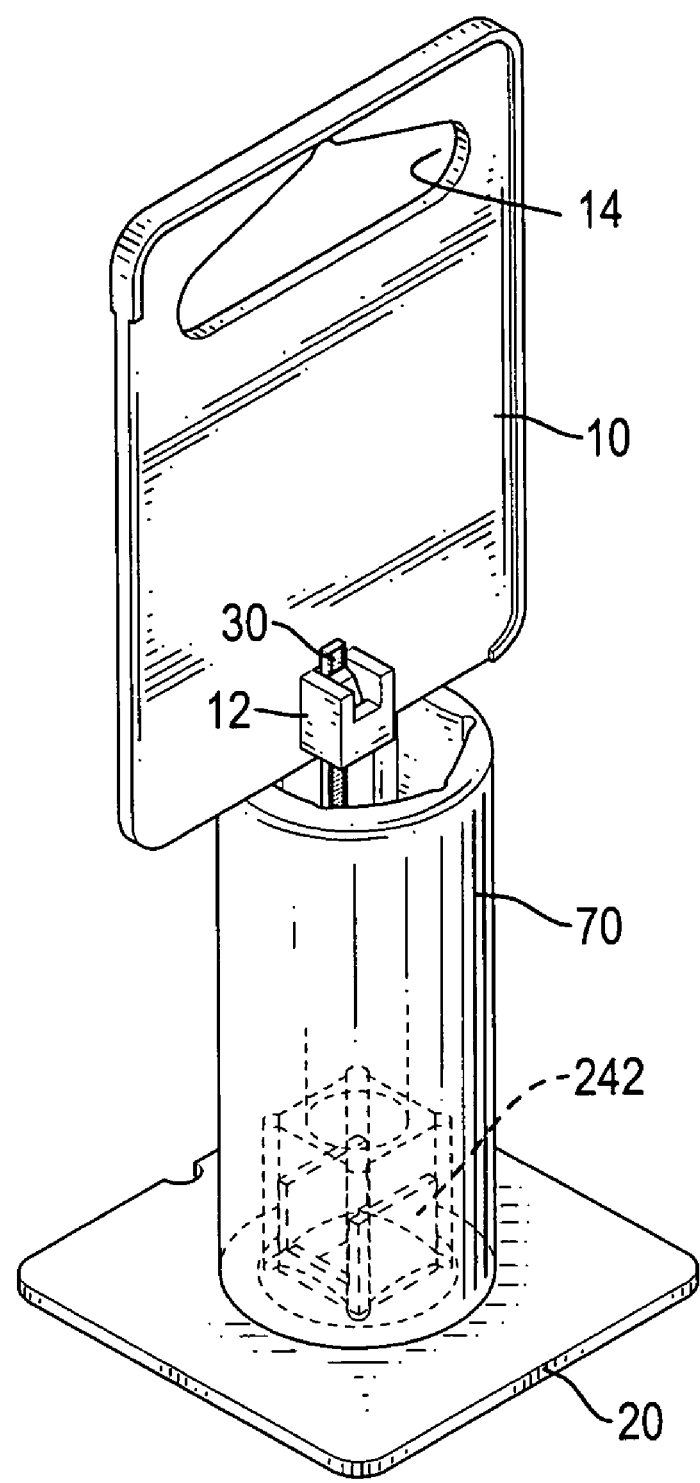
FIG. 2 is a perspective view of the suspension device in combination in FIG. 1.
Figure 3:
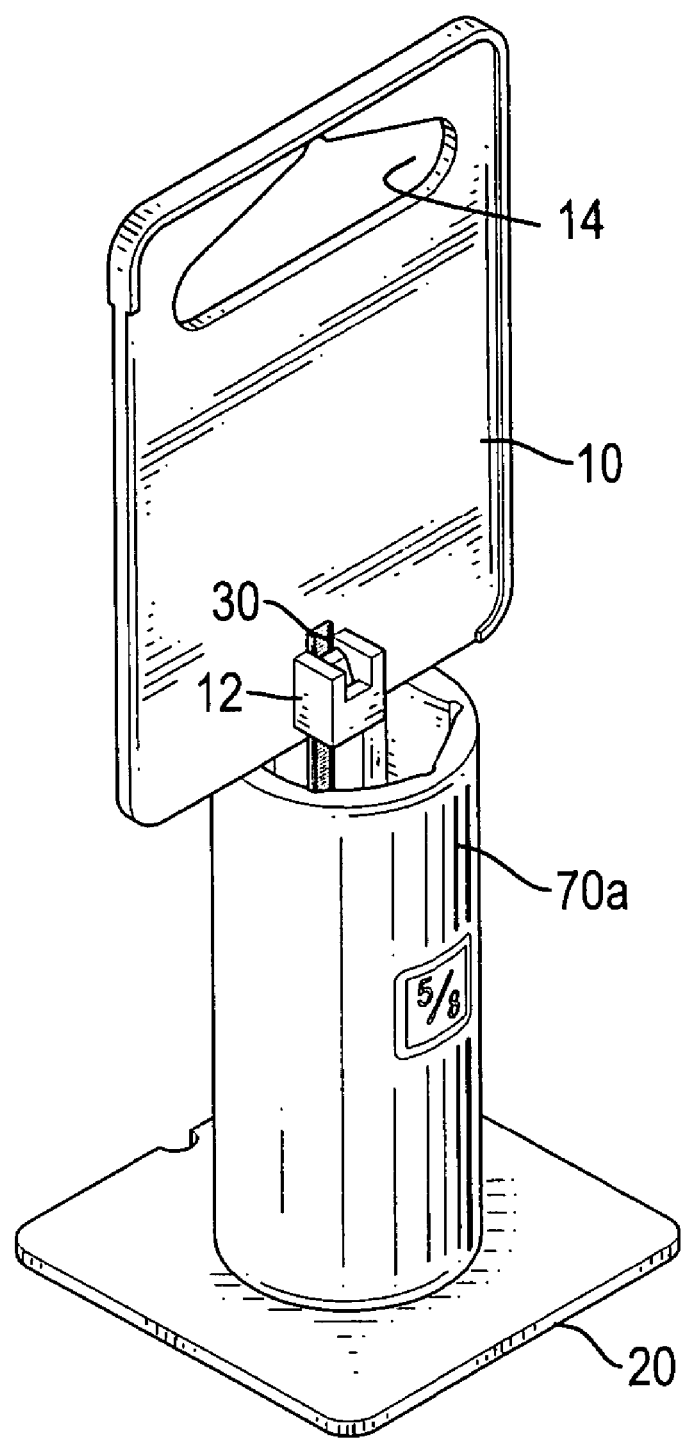
FIG. 3 is an operational perspective view of the suspension device in FIG. 1 holding a ⅝" tool socket.
Figure 4:
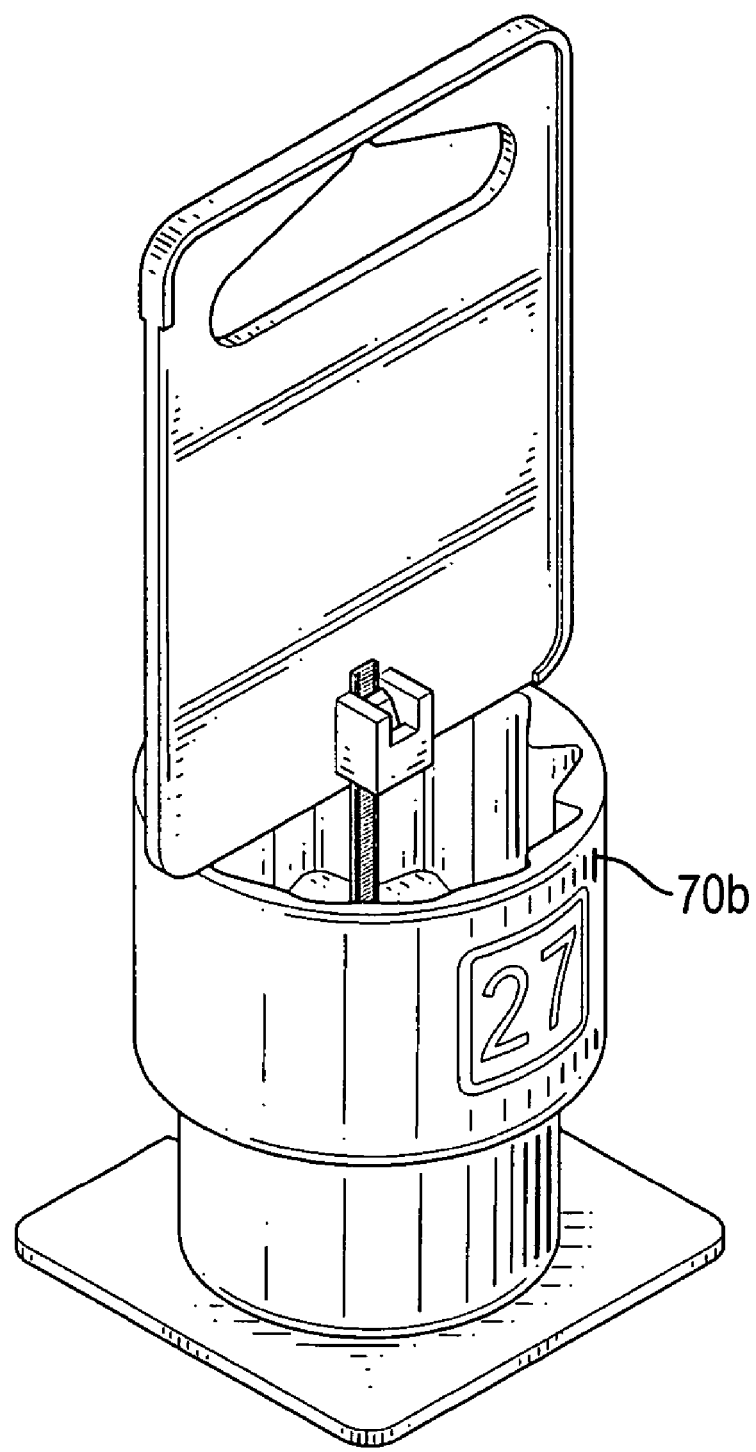
FIG. 4 is an operational perspective view of the suspension device in FIG. 1 holding a 27 mm tool socket.
Figure 5:
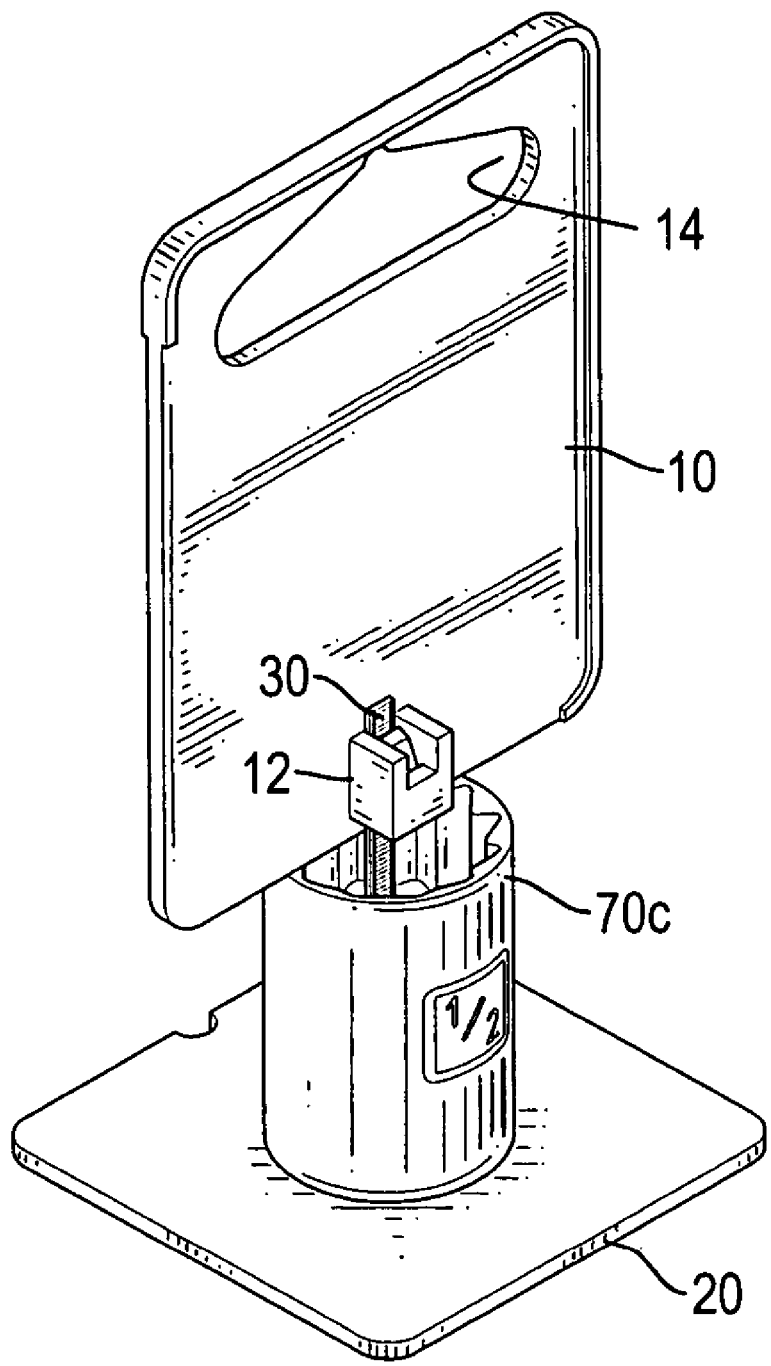
FIG. 5 is an operational perspective view of the suspension device in FIG. 1 holding a ½" tool socket.
Figure 6:
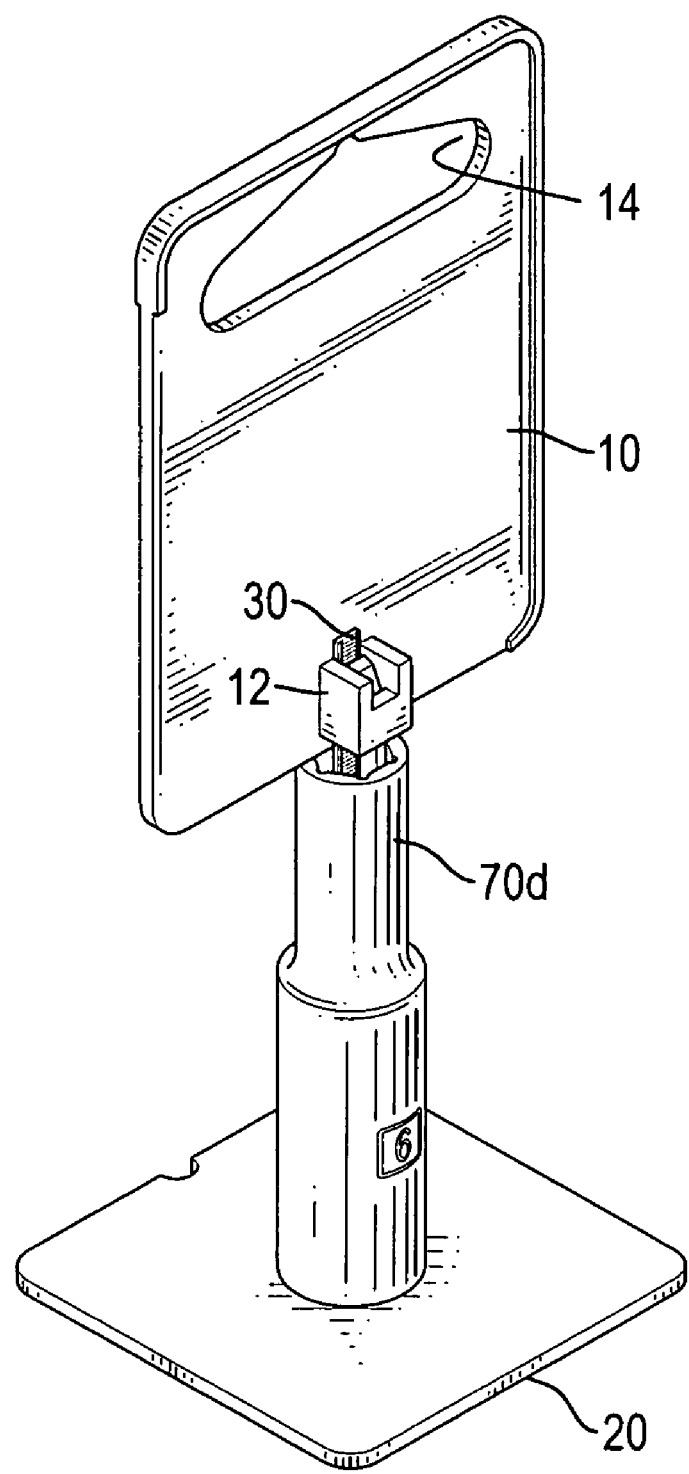
FIG. 6 is further another operational perspective view of the suspension device in FIG. 1 holding a 6 mm tool socket.
Figure 7:
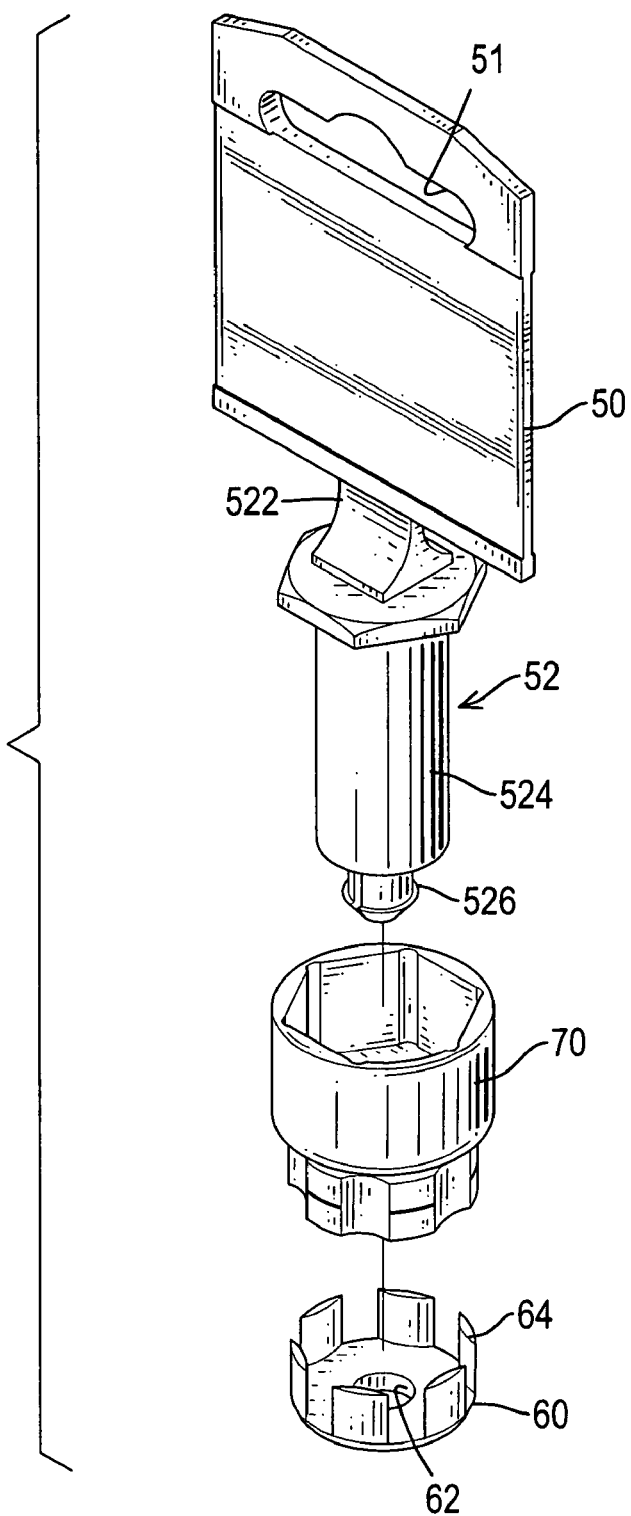
FIG. 7 is an exploded perspective view of a conventional suspension device for a tool socket in accordance with the prior art.

With reference to FIGS. 1 and 2, a suspension device in accordance with the present invention comprises a hanging panel (10), an end cap (20) and a fastening strip (30).

The hanging panel (10) may be rectangular and has a top edge, a bottom edge, a front surface, an optional suspension hole (14) and a strip latch (12). The suspension hole (14) is defined near the top edge of the hanging panel (10) to hang the suspension device on a hook (not shown) or the like. The strip latch (12) is formed integrally on the hanging panel (10) near the bottom edge and has a front edge, a channel (122) and a pawl (124). The channel (122) is defined longitudinally through the strip latch (12) and has an open top end. The pawl (124) extends upward from the front edge into the channel (122) at the open top end of the channel (122).

The end cap (20) may be rectangular and has a top surface, a center, a through hole (22) and an optional retaining guide (24). The through hole (22) is defined at the center of the end cap (20). The retaining guide (24) is formed on and protrudes up from the top surface of the end cap (20), extends into a drive hole of a tool socket and may have multiple wings (242). The retaining guide prevents the tool socket from rotating so tool size marks can be kept facing forward. Two wings (242) are formed in parallel on and protruding up from the top surface of the end cap (20) on opposite sides of the through hole (22).

The fastening strip (30) is made of resilient plastic, is mounted through the through hole (22) in the end cap (20), a tool socket (70) and the strip latch (12) on the hanging panel (10) and has an elongated body, a proximal end, a distal end, a block (32) and a tongue (34). The elongated body has an optional toothed face (302). The toothed face (302) is formed along the elongated body and engages the pawl (124) in the strip latch (12) to hold the fastening strip (30) adjustably in the strip latch (12). The tongue (34) is formed at the distal end of the fastening strip (30) to allow the distal end of the fastening strip (30) to pass easily through the strip latch (12). Pulling the tongue (34) mounted in the strip latch (12) will pull the end cap (20), a tool socket (70) and the hanging panel (10) tightly together. After the fastening strip (30) is pulled tight in the strip latch (12), the tongue (34) and any elongated body protruding from the strip latch (12) are cut to make the appearance of the suspension device neat. The block (32) is formed on the proximal end of the fastening strip (30), is larger than the through hole (22) in the end cap (20) and holds the end cap (20) on the fastening strip (30). The fastening strip (30) may be a cable pull-tie often used to bind wires together. Therefore, manufacturer can buy ready-made fastening strips (30) to simplify the manufacturing process of the suspension device.

With reference to FIGS. 3 to 6, the suspension device in the present invention is combined with different tool sockets (70a, 70b, 70c, 70d).

The suspension device has the following advantages:

1. The structure of the hanging panel (10) and the end cap (20) are simple so manufacturing procedures are simplified to improve the production rate.

2. The fastening strips (30) can be replaced with ready-made cable pull-ties that are easily obtained.

3. Assembling the suspension device is easy and convenient by simply inserting the fastening strip (30) sequentially through the end cap (20), the tool socket (70) and the strip latch (12).

4. Because the fastening strip (30) can pass through any tool socket and be adjusted in length, the fastening strip (30) can hold various sized tool sockets so the suspension device has no limitation in use.

Therefore, the suspension device for a tool socket is practical and useful. Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A suspension device for a tool socket (70) comprising:
    a hanging panel (10) having
        a top edge;
        a bottom edge;
        a front surface;
        a strip latch (12) formed integrally on the hanging panel (10) and having
            a front edge;
            a channel (122) defined longitudinally through the strip latch (12) and having an open top end; and
            a pawl (124) extending upward from the front edge into the channel (122) at the open top end of the channel (122);
    an end cap (20) having
        a top surface;
        a center; and
        a through hole (22) defined at the center of the end cap (20); and
    a fastening strip (30) mounted through the through hole (22) in the end cap (20) and the strip latch (12) on the hanging panel (10) to hold the tool socket (70) between the hanging panel (10) and the end cap (20) and having
        an elongated body;
        a proximal end;
        a distal end;
        a block (32) formed on the proximal end of the fastening strip (30), being larger than the through hole (22) in the end cap (20) and holding the end cap (20) on the fastening strip (30); and
        a tongue (34) formed at the distal end of the elongated body to allow the distal end of the fastening strip (30) to pass easily through the strip latch (12).

2. The suspension device as claimed in claim 1, wherein the elongated body of the fastening strip (30) further has a toothed face (302) to adjustably engage the pawl (124) on the strip latch (12).

3. The suspension device as claimed in claim 1, wherein the end cap (20) further has a retaining guide (24) formed on and protruding up from the top surface of the end cap (20).

4. The suspension device as claimed in claim 2, wherein the end cap (20) further has a retaining guide (24) formed on and protruding up from the top surface of the end cap (20).

5. The suspension device as claimed in claim 3, wherein the retaining guide (24) has multiple wings (242) formed in parallel on and protruding up from the top surface of the end cap (20) on opposite sides of the through hole (22).

6. The suspension device as claimed in claim 4, wherein the retaining guide (24) has multiple wings (242) formed in parallel on and protruding up from the top surface of the end cap (20) on opposite sides of the through hole (22).

7. The suspension device as claimed in claim 4, wherein the hanging panel (10) further has a suspension hole (14) defined near the top edge.

8. The suspension device as claimed in claim 1, wherein the fastening strip (30) is a cable pull-tie.

* * * * *